(12) United States Patent
Tsuji et al.

(10) Patent No.: US 7,290,936 B2
(45) Date of Patent: Nov. 6, 2007

(54) SLIDE MEMBER, MANUFACTURING METHOD AND MANUFACTURING APPARATUS OF THE SAME

(75) Inventors: Hideo Tsuji, Inuyama (JP); Masahito Fujita, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 153 days.

(21) Appl. No.: 11/073,744

(22) Filed: Mar. 8, 2005

(65) Prior Publication Data

US 2005/0196085 A1 Sep. 8, 2005

(30) Foreign Application Priority Data

Mar. 8, 2004 (JP) ............................. 2004-064015

(51) Int. Cl.
*F16C 17/00* (2006.01)

(52) U.S. Cl. ................................. 384/293; 29/898.042

(58) Field of Classification Search ................ 384/293; 29/898.03, 898.04, 898.041, 898.042
See application file for complete search history.

(56) References Cited

FOREIGN PATENT DOCUMENTS

| | | | |
|---|---|---|---|
| JP | 63-103087 A | 5/1988 | |
| JP | 63-256288 A | 10/1988 | |
| JP | 04-203616 A | 7/1992 | |
| JP | 05-033809 A | 2/1993 | |
| JP | 2000-035042 A | 2/2000 | |
| JP | 2000-504089 A | 4/2000 | |
| JP | 2002-147459 | 5/2002 | |
| WO | WO-97/28379 A2 | 8/1997 | |

*Primary Examiner*—Lenard A. Footland
(74) *Attorney, Agent, or Firm*—Browdy and Neimark, PLLC

(57) ABSTRACT

In a slide member such as a slide bearing, the invention can make a height of a bank portion around an oil keeping concave portion small, whereby it is possible to improve an initial conformability and improve an anti-seizure performance. A plurality of holes are formed on a slide surface with respect to an opposing member by a fiber laser apparatus. At this time, in the case that a height of a bank portion generated in the periphery of the concave portions in accordance with the laser processing so as to bulge from a slide surface is set to t, and a depth of the concave portions from the slide surface is set to h, an energy density of the laser beam is adjusted such that a value t is equal to or less than 3 μm, and a rate t/h is between 0.1 and 0.5.

9 Claims, 6 Drawing Sheets

SLIDE MEMBER, MANUFACTURING METHOD AND MANUFACTURING APPARATUS OF THE SAME

TECHNICAL FIELD

The present invention relates to a slide member in which a plurality of small concave portions are formed on a slide surface, and a manufacturing method and a manufacturing apparatus of the same.

BACKGROUND ART

An internal combustion engine used in a motor vehicle or the like converts a reciprocating motion of a piston obtained by an explosive power of a fuel into a rotational motion by a connecting rod and a crank shaft, thereby obtaining a rotational driving force. The piston, the connecting rod and the crank shaft are connected by a piston pin and a crank pin. Further, the piston pin and the crank pin are borne by a slide bearing, and each of the slide bearings is repeatedly exposed to a variable load from the piston pin or the crank pin corresponding to an opposing shaft.

The slide bearing is generally structured such that an oil film is formed between the slide surface and the opposing shaft by supplying a lubricating fluid from an external portion so as to prevent a metal contact which is in direct contact with the opposing shaft from being generated. However, in the case that the opposing shaft slides with respect to the slide surface while applying the variable load to the slide surface, such as the slide bearing of the internal combustion engine mentioned above, the oil film is broken down and the metal contact tends to be generated, thereby causing a seize. In the case of the slide bearing which is used under an environment in which the oil film breakage is likely to be generated, it is preferable to improve a lubricating fluid keeping performance of the slide surface in such a manner that the lubricating fluid is excluded from the slide surface so as to prevent the oil film from being broken down even if the variable load is applied from the opposing shaft.

As the slide member in which the lubricating fluid keeping performance is improved, there exists a structure described in JP-A-2002-147459 (patent document 1). This structure is made such that an overlay layer is attached onto a bearing alloy layer, and hard micro particles are sprayed to the overlay layer in accordance with a shot blast so as to form micro concave portions on a surface of the overlay layer corresponding to the slide surface, thereby improving an oil keeping performance.

In the slide member described in the patent document 1, since the concave portion is formed on the overlay layer in accordance with a plastic deformation, a periphery thereof bulges (the bulged portion is called as a bank portion). Since a load is concentrated to the bank portion and a problem that the bank portion tends to seizure, a height of the bank portion is lowered by applying a polishing work such as a barrel finishing or the like after the shot blast. However, a after finishing such as the polishing work is required in this case, and a manufacturing cost is increased.

Further, since the concave portions are formed in accordance with the shot blast, the formed concave portions are partly overlapped with each other so as to be in a state in which the concave portions are connected to each other. Accordingly, when the opposing member presses the slide surface at a high load, the lubricating fluid flows out from the concave portion to the concave portion, so that the lubricating fluid runs away from the slide surface, and it is undesirable to improve the oil keeping performance.

SUMMARY OF THE INVENTION

The present invention is made by taking the matters mentioned above into consideration, and an object of the present invention is to provide a slide member in which a height of a bank portion around concave portions can be lowered without applying any after finishing such as a polishing work or the like, the concave portions are not overlapped with each other, and an oil keeping performance can be improved, and a manufacturing method and a manufacturing apparatus of the same.

In order to achieve the object mentioned above, in accordance with the present invention, there is provided a slide member having a plurality of concave portions formed on a slide surface with respect to an opposing member, wherein the concave portions are formed in accordance with a laser processing, and in the case that a height of a bank portion generated in the periphery of the concave portions in accordance with the laser processing so as to bulge from the slide surface is set to t, and a depth of the concave portions from the slide surface is set to h, a value t is equal to or less than 3 μm, and a rate t/h is between 0.1 and 0.5.

In accordance with the structure mentioned above, since the height t of the bank portion is equal to or less than 3 μm, the opposing member moves on the slide surface at a time of an actual use, whereby the bank portion collapses in an early stage or is worn away in an early stage. Accordingly, the structure is excellent in an initial conformability, and an anti-seizure performance is improved.

Further, since the concave portion is laser processed, it is possible to independently form the concave portions one by one. Further, it is possible to increase a depth of the concave portion in comparison with the height of the bank portion. On the basis of these reasons, it is possible to store a lot of lubricating fluid within the concave portions, it is possible to prevent the problem that the lubricating fluid within the concave portions is not supplied to the slide surface with respect to the opposing shaft, the lubricating fluid flows out to the external portion in the early stage while coming down from the concave portion to the concave portion as much as possible, and it is possible to reduce a frictional resistance.

Further, in accordance with the present invention, the structure may be made such that in the case that a diameter of the concave portion in the slide surface is set to d, a rate h/d is between 0.3 and 1.0.

In accordance with this structure, since an opening of the concave portion in the slide surface is larger than the depth, it is easy to supply the lubricating fluid to the slide surface.

In accordance with the present invention, the structure may be made such that a rate of the concave portions in a region in which the concave portions are formed is set to an area rate between 0.5 and 10%.

It is preferable in view of a relation between a pressure receiving load and a friction coefficient that the rate of the concave portions is set to this level.

In accordance with the present invention, the structure may be made such that the concave portions are arranged along a line which is inclined with respect to a moving direction of the opposing member in the slide surface.

In accordance with this structure, it is possible to supply the lubricating fluid stored in the concave portions to the slide surface all over.

In accordance with the present invention, in order to form the concave portions mentioned above, there is employed a method of forming the concave portions by irradiating a laser beam having a power density between 1 MW/cm² to 15 GW/cm² to the slide surface.

When irradiating the laser beam, an irradiated portion is melted. Further, the melted material bulges in the periphery of the irradiated portion of the laser beam, whereby the concave portions are formed, and the bank portion is generated around the concave portion. The irradiated portion of the laser beam reaches a high temperature and is melted, and a part of the irradiated portion is vaporized, if the concave portions are formed on the basis of the laser beam having the high power density as in the present invention. Accordingly, the height of the bank portion bulging around the concave portions becomes low.

In this case, the structure may be made such that the laser beam is constituted by a pulse-like laser beam having a frequency equal to or more than 1 kHz.

In the laser beam having the high power density, it is possible to form one concave portion by irradiating the laser beam having one pulse. Accordingly, a lot of concave portions can be formed for a short time by employing the pulse laser beam having a frequency equal to or more than 1 kHz.

In accordance with the present invention, aiming at a slide member in which a slide surface is formed in a cylindrical inner surface, there is provided a manufacturing apparatus for forming concave portions on the slide surface corresponding to the cylindrical inner surface, comprising:

a fiber laser apparatus;

a slide member holding means for holding the slide member; and a fiber holding means for holding an end portion of a fiber of the fiber laser apparatus in a state of opposing to a slide surface of the slide member in an inner side of the slide member held by the holding means, wherein the concave portions are formed in the slide surface by irradiating a laser beam radiated from the end of the fiber to the slide surface of the slide member.

Further, in accordance with the present invention, there is provided a manufacturing apparatus, comprising:

a fiber laser apparatus;

a slide member holding means for holding the slide member; and a reflecting mirror reflecting a laser beam radiated from an end of a fiber of the fiber laser apparatus so as to irradiate to a slide surface of the slide member, whereby forming the concave portions in the slide surface.

Other objects, features and advantages of the present invention will become apparent from the following description of the embodiments of the present invention with reference to the accompanying drawings.

BRIEF DESCRIPTION OF THE DRAWINGS

FIGS. 6A and 6B show a jig and a half bearing, in which

In the drawings, reference numeral 5 denotes a crank pin bearing (a slide member), reference numeral 6 denotes a slide surface, reference numeral 7 denotes a hole, reference numeral 8 denotes a bank portion, reference numeral 9 denotes a hole processing apparatus, reference numeral 13 denotes a jig (a slide member holding means), reference numeral 14 denotes a fiber laser apparatus, reference numeral 15 denotes a laser oscillator, reference numeral 17 denotes a holding rod (a fiber holding means), reference numeral 19 denotes a focusing lens, reference numeral 20 denotes a solid lubricant, reference numeral 21 denotes a hole processing apparatus, and reference numeral 22 denotes a mirror.

DESCRIPTION OF THE PREFERRED EMBODIMENT

A description will be given of an embodiment in which a slide member in accordance with the present invention is applied to a bearing (hereinafter, refer to a crank pin bearing) in a large end portion constituting a connecting rod of an engine for a motor vehicle with reference to FIGS. 1 to 6.

Figure 4:
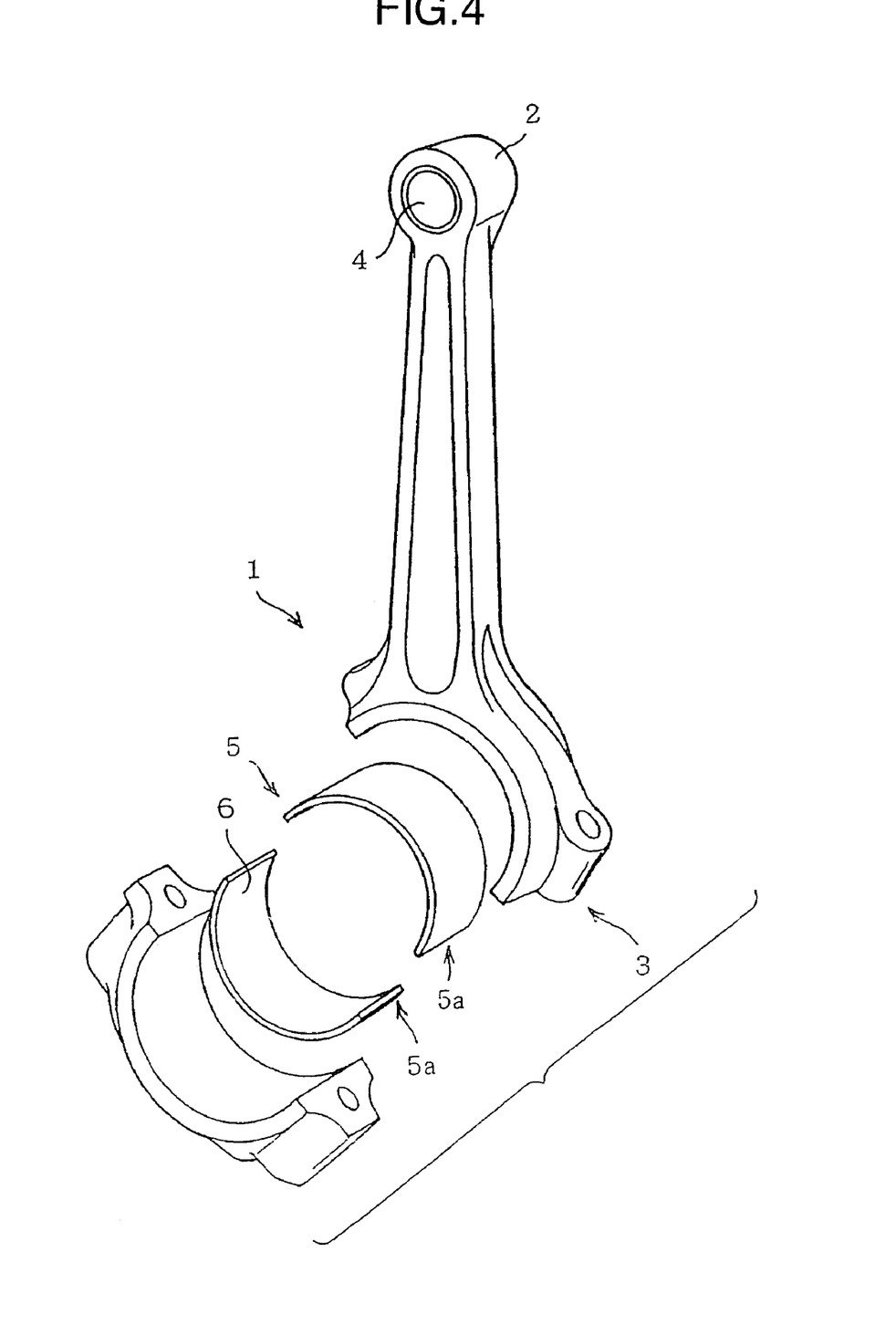
FIG. 4 is a perspective view of a connecting rod.

As shown in FIG. 4, a connecting rod 1 is structured such that one of both end portions in a longitudinal direction is formed as a small end portion 2 connected to a piston pin, and the other end portion is formed as a large end portion 3 connected to a crank pin. Further, a piston pin bearing 4 and a crank pin bearing 5 are attached respectively to both the end portions 2 and 3, the piston pin bearing 4 supports the piston pin, and the crank pin bearing 5 supports the crank pin.

Figure 1:
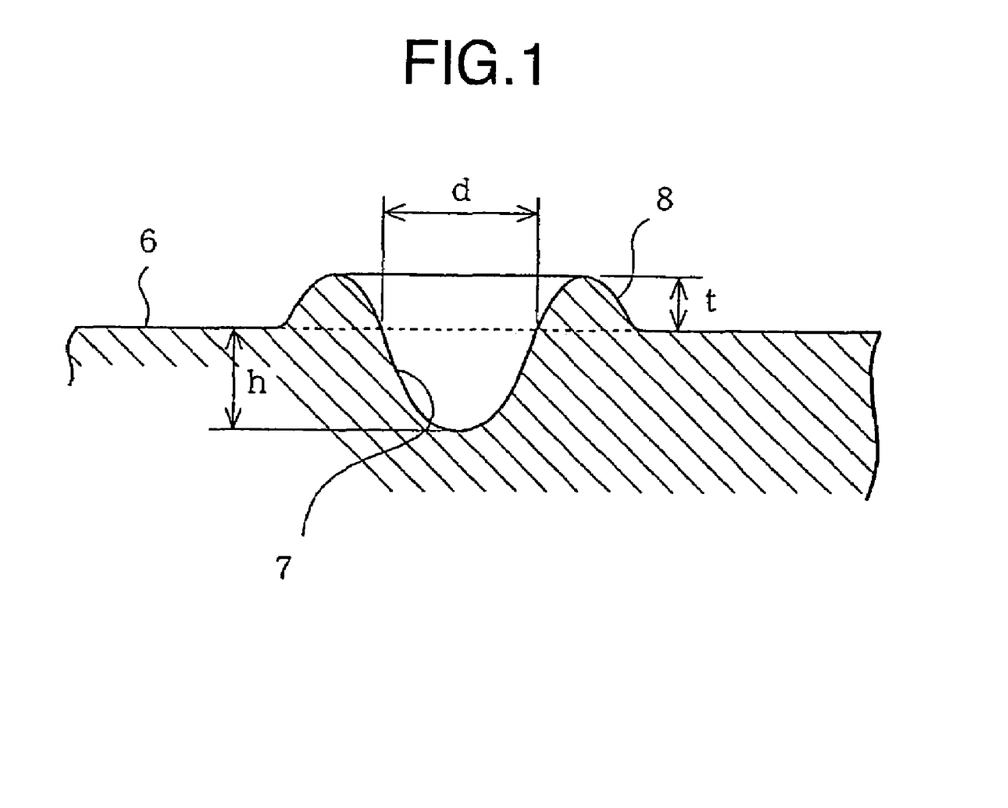
FIG. 1 is an enlarged cross sectional view of a hole, and shows an embodiment in accordance with the present invention.

The crank pin bearing 5 is structured in a cylindrical shape by confronting two semi-cylindrical half bearings 5a. The semi-cylindrical bearing 5a is structured by linking a bearing alloy onto a steel back metal, an extremely lot of micro holes 7 serving as the concave portions as shown in FIG. 1 are formed all around an entire of a slide surface (a bearing alloy surface) 6.

The hole 7 is formed in accordance with a laser processing as described below, and a bank portion 8 bulging from the slide surface 6 corresponding to an inner surface of the half bearing 5a exists in the periphery of the hole 7.

In this case, a description will be given of a diameter and a depth of the hole 7 mentioned above, a height of the bank portion 8 and the like. First, as shown in FIG. 1, it is assumed that the diameter d and the depth h of the hole 7 are defined in a state in which the bank portion 8 is removed. In other words, on the assumption that the diameter d of the hole 7 is measured on a surface having the same level as the slide surface 6, and the depth h is measured on the basis of the slide surface 6, for example, the diameter d of the hole 7 can be formed between 1 and 100 μm, the depth h of the hole 7 can be formed between 1 and 30 μm, and the height t of the bank portion 8 from the slide surface 6 can be formed equal to or less than 3 μm. In this case, in preferable, the diameter d of the hole 7 is between 3 and 90 μm, and the depth h of the hole 7 is between 1.5 and 29 μm. More preferably, the diameter d is between 6 and 30 μm, and the depth h is between 2 and 10 μm.

Further, the depth h of the hole 7 is formed between 0.3 and 1.0 times of the diameter d, that is, so as to satisfy a relation h/d=0.3 to 1.0, and the height t of the bank portion 8 is formed between 0.1 and 0.5 times of the depth h of the hole 7, that is, so as to satisfy a relation t/h=0.1 to 0.5.

The hole 7 mentioned above is formed such that a rate occupied in an entire of the slide surface 6 corresponding to the formed region is between 0.5 and 10% in an area rate S. In this case, an area of the hole 7 means an aperture area on the slide surface 6 on the basis of the diameter d. The formed region corresponds to a region in which the hole 7 is formed in accordance with a laser processing, and in detail, means a region formed by connecting holes in outermost positions (including the holes).

Figure 2A:
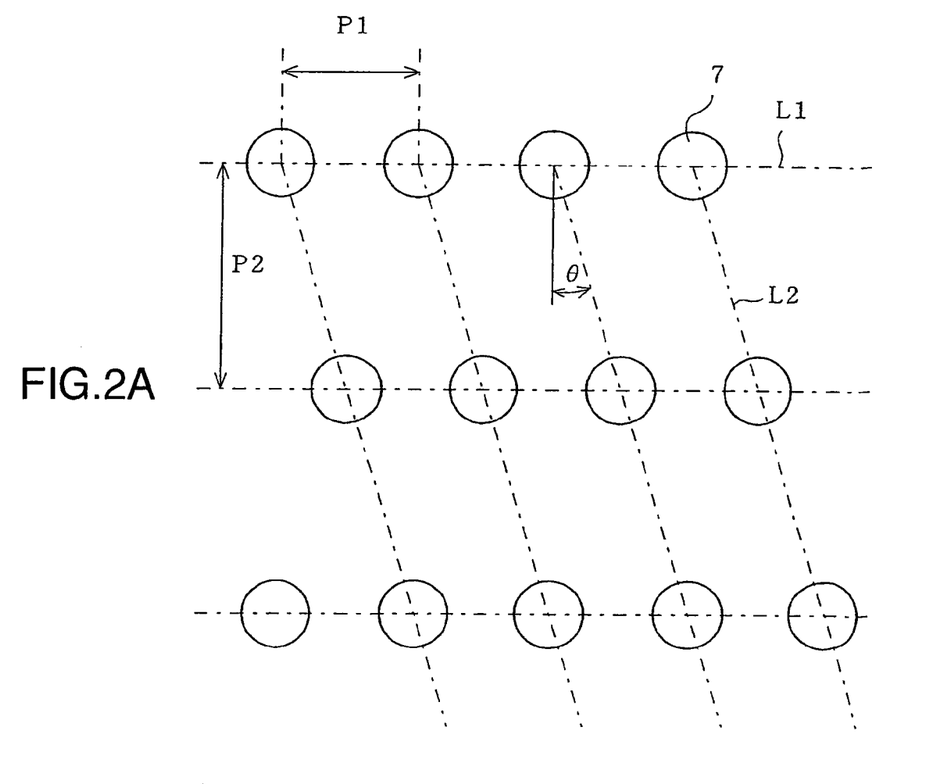
FIGS. 2A, 2B and 2C are plan views for explaining an aspect of an arrangement of the holes.

As shown in FIG. 2A, the holes 7 are formed so as to be arranged on a straight line extending in a width direction (a straight line in parallel to a center axis of the crank pin bearing 5) L1 at a fixed pitch interval P1, with respect to a width direction of the slide surface 6 (an axial direction of the half bearing 5a: a lateral direction in FIG. 2A), and be arranged on a straight line L2 inclined at θ in a circumferential direction at a fixed pitch interval P2 in a circumferential direction with respect to a circumferential direction (a sliding direction of the crank pin corresponding to the opposing member: a vertical direction in FIG. 2A).

Figure 2B:
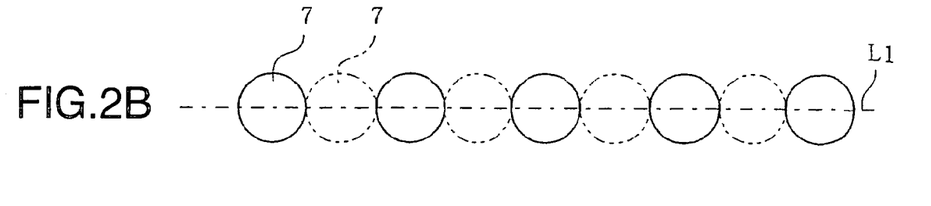
Figure 2C:
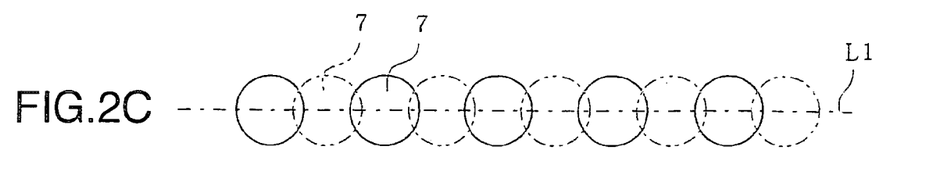

In this case, the pitch intervals P1 and P2 and the slope angle θ are appropriately determined together with the magnitude of the diameter d of the hole 7 such that when the holes 7 arranged on two straight lines L1 which are adjacent in the circumferential direction are arranged on one straight line in the straight lines L1 extending in the axial direction while keeping the position in the width direction as it is, the holes 7 are arranged with no gap as shown in FIG. 2B, or are arranged so as to be partly overlapped with each other as shown in FIG. 2C.

Figure 5A:
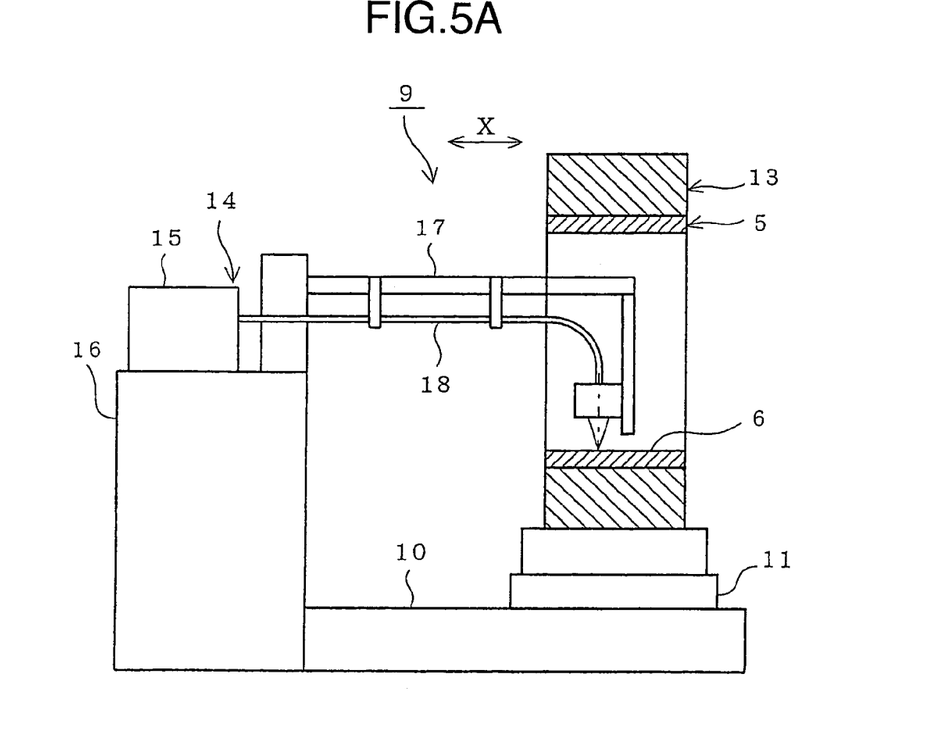
FIGS. 5A and 5B are cross sectional views showing a hole processing apparatus.

Next, a description will be given of a method of forming the hole 7 in the crank pin bearing 5. FIG. 5A shows a hole processing apparatus 9. A slider 11 is movably provided on a bed 10 thereof, and a jig 13 serving as a slide member holding means for holding the crank pin bearing 5 is rotatably attached onto the slider 11. The jig 13 is formed in a half-divided cylindrical shape as shown in FIGS. 6A and 6B, and is rotationally driven by a servo motor (not shown).

Figure 5B:
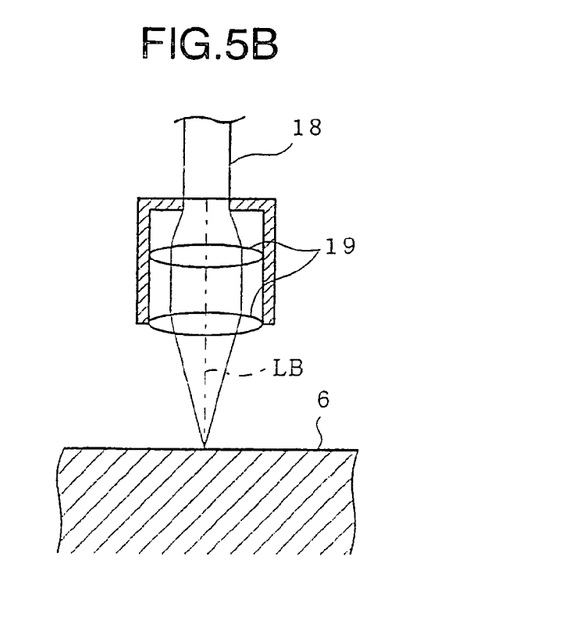

Further, a laser oscillator 15 of a fiber laser apparatus 14 is attached to the bed 10 via a mounting table 16. A holding rod 17 serving as a fiber holding means is approximately horizontally attached to the laser oscillator 15, and a fiber 18 guided from the laser oscillator 15 is held in the holding rod 17. An end of the fiber 18 is bent downward, and a focusing lens 19 is attached to the end portion as shown in FIG. 5B. Further, a laser beam radiated from a leading end of the fiber 18 is focused by the focusing lens 19. A position of the focusing lens 19 is determined such that a focus of the focusing lens 19 is positioned on the slide surface 6 of the crank pin bearing 5 attached to the jig 13.

Figure 6A:
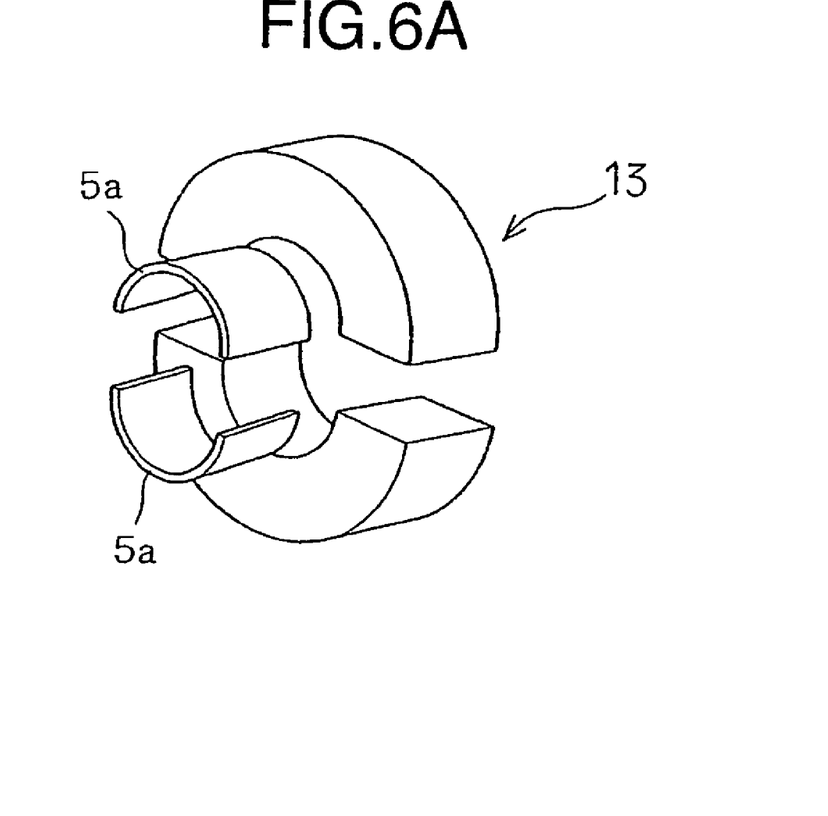
FIG. 6A is a perspective view and FIG. 6B is a front elevational view.
Figure 6B:
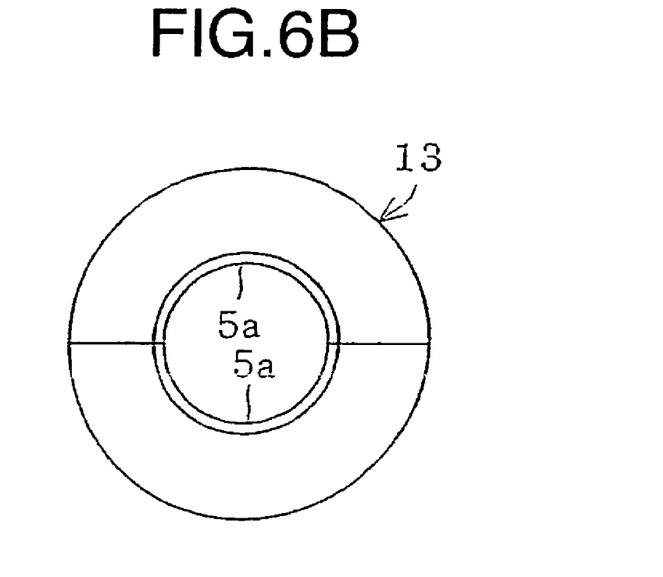

In order to form the hole 7 on the slide surface of the crank pin bearing 5 by the hole processing apparatus 9, first, as shown in FIG. 6, two half bearings 5a are attached to the jig 13 in a confronting state. Further, a laser beam LB is radiated to the fiber 18 by oscillating the laser oscillator 15. The laser beam LB ascends an energy density in the process of being propagated within the fiber 18. Further, the laser beam LB is finally radiated from the end of the fiber 18, and is focused by the focusing lens 19 so as to be irradiated on the slide surface 6 of the crank pin bearing 5.

At this time, the laser beam LB irradiated onto the slide surface 6 is formed as a pulse-like laser beam LB, a frequency thereof is equal to or more than 1 kHz, and a power density thereof is between 1 MW/cm$^2$ and 15 GW/cm$^2$. Further, the bed 10 moves at one pitch in a direction X (an axial direction of the crank bearing 5) or the jig 13 rotates at one pitch just before irradiating one pulse laser beam LB such that one hole 7 can be formed by one pulse laser beam LB.

In this case, when the laser beam LB is irradiated on the slide surface 6 of the crank pin bearing 5, the irradiated position is molten. At this time, since the energy density of the laser beam LB is large such as 1 MW/cm$^2$ to 15 GW/cm$^2$, the irradiated position of the laser beam LB is not only molten, but also partly vaporized. Further, the molten material is extruded by an assist gas applied to the slide surface 6 from the above in such a manner as to surround the laser beam LB so as to be solidified, and forms the bank portion 8 in the periphery of the hole 7.

At this time, since the irradiated position of the laser beam LB having the high energy density is partly vaporized, an amount of the molten material solidified as the bank portion 8 is smaller in comparison with the case of irradiating the laser beam having a low energy density. Accordingly, it is possible to make the height of the bank portion 8 low, and it is possible to make the height equal to or less than 3 μm as in the present invention. As mentioned above, the pulse-like laser beam having the frequency equal to or more than 1 MHz and the enough high energy density to melt and vaporize the bearing alloy constituting the slide surface 6 can be first achieved by employing the fiber laser apparatus 14. In this case, it is preferable that the energy density is equal to or more than 10 MW/cm$^2$. The energy density can be easily obtained by the fiber laser apparatus 14.

Figure 3:
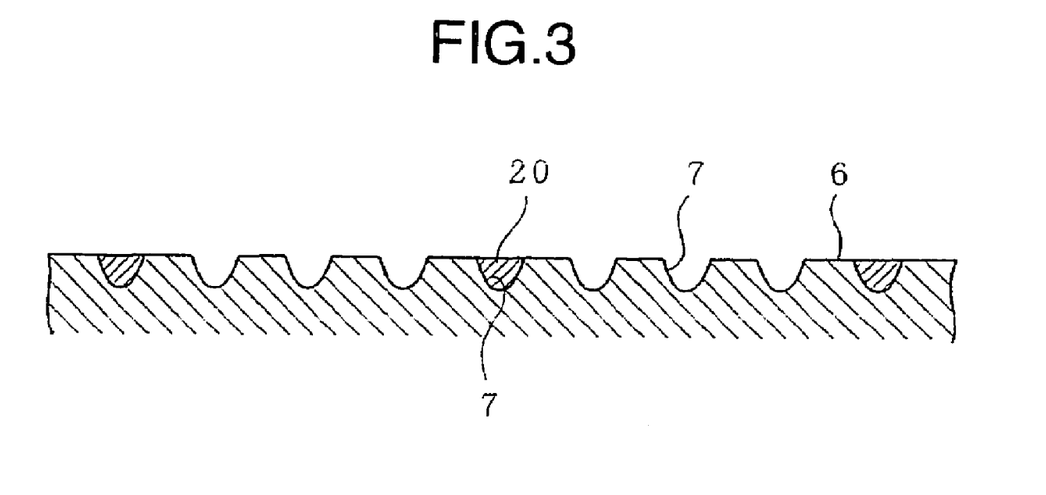
FIG. 3 is a cross sectional view of a plurality of holes.

In the holes 7 of the slide surface formed in the manner mentioned above, in accordance with the present embodiment, a solid lubricant 20 is received in one or more holes thereof, not all the holes. In other words, as shown in FIG. 3, there exists the hole 7 in which the solid lubricant 20 is received in an inner portion. A method of receiving the solid lubricant 20 in the hole 7 includes the following two methods.

Method 1: in the case of receiving any one of lead, tin, bismuth, molybdenum disulfide, graphite, tungsten disulfide and PTFE, the solid lubricant is made fine powder (a powder diameter equal to or less than 5 μm), and is added to an oil so as to be formed in a paste form. Next, the paste-like solid lubricant is received in the inner portion of the hole 7 by being applied to the slide surface of the slide member heated to 100° C. to 150° C.

Method 2: in the case of receiving any one of lead, tin, bismuth, molybdenum disulfide, graphite, tungsten disulfide and PTFE, the solid lubricant is made fine powder (a powder diameter equal to or less than 5 μm), and is added to a thermosetting resin or a thermoplastic resin dissolved or dispersed in an organic solvent so as to be formed in a paste form. Next, the paste-like solid lubricant is received in the inner portion of the hole 7 by being applied to the slide surface of the slide member heated to 100° C. to 150° C.

Next, a description will be given of an operation in accordance with the present embodiment with regard to the crank pin bearing 5.

In an engine drive state, a lubricating oil fed from a lubricating oil pump (not shown) is supplied between the slide surfaces of the crank pin bearing 5 and the crank pin, whereby a lubrication between the slide surfaces is achieved. When the engine stops, the supply of the lubricating oil from the lubricating oil pump is stopped, however, the lubricating oil between the slide surfaces is stored in the other holes 7 than the holes in which the solid lubricant 20 is received.

When the engine restarts, the lubricating oil pump is activated and starts pressure feeding the lubricating oil, however, some amount of time is required until the lubricating oil is supplied between the slide surfaces of the crank pin bearing 5 and the crank pin. However, since the lubricating oil is stored in the hole 7, the lubricating oil within the hole 7 is supplied between the slide surfaces of the crank pin bearing 5 and the crank pin in accordance with the rotation of the crank pin. Alternatively, since the solid lubricant 20 is received in the hole 7, the crank pin bearing 5 and the crank pin smoothly slide without being in direct contact therebetween. Accordingly, there is no risk that the crank pin bearing 5 and the crank pin reach the seizure.

In this case, as shown in FIG. 2, since the hole 7 is formed so as to be arranged along the line L2 which is inclined with respect to the circumferential direction, the lubricating oil supplied between the slide surfaces from the hole 7 and the solid lubricant 20 in accordance with the rotation of the crank pin, exist in an entire of the slide surface 6 with hardly having any discontinuity in the axial direction, so that a further effect can be obtained for preventing the seizure and an abrasion from being generated.

Further, since the height of the bank portion 8 in the periphery of the hole 7 is low such as 3 μm or less, the bank portion 8 is collapsed or abraded in the early stage without applying any particular polishing work for making the bank portion 8 low. An initial conformability and an anti-seize property of the crank pin bearing 5 are improved on the basis of an early collapse and abrasion of the bank portion 8.

Further, since the hole 7 on the slide surface 7 is formed in accordance with the laser beam LB, it is possible to form a uniform hole 7 in a desired shape, and it is possible to prevent a dispersion of an oil keeping performance, or an oil film maintaining performance in the slide surface. Further, since the hole 7 is not continuously provided, it is possible to prevent a matter that the lubricating oil is directly transferred from one hole 7 to the other holes 7 so as to be discharged from the portion between the slide surfaces, and it is possible to secure an improved lubricating performance by the lubricating oil.

On the other hand, when an output of the engine is increased, the crank pin bearing 5 and the crank pin slide in a state in which a high pressure is applied between the crank pin bearing 5 and the crank pin. Accordingly, the bearing surface pressure of the slide surface in the crank pin bearing 5 is increased, an oil film pressure between the slide surfaces of the crank pin bearing 5 and the crank pin is increased, and a part of the oil film is collapsed by the pressure mentioned above so as to become thin.

Since the lubricating oil is supplied from the hole 7 in the same manner as mentioned above in this case, or since the solid lubricant is received in the hole 7, there is no risk that a metal contact state is generated, and it is possible to effectively prevent the seizure.

The inventor of the present invention prepares samples 1 to 12 of the invention products and samples 1 to 3 of the comparative products shown in the following Table 1, in order to confirm the effect of the present invention, executes a seizure test with respect to each of the samples, and describes results of measurement of a back surface temperature of the sample and a friction coefficient in the test surface pressure of 7 MPa in Table 1. In this case, the test condition of the seizure test are as described in Table 2.

TABLE 1

| Sample | Structure | | | | | | | Seize test | | Remarks |
| --- | --- | --- | --- | --- | --- | --- | --- | --- | --- | --- |
| | Height of bank portion (μm) t | Depth of hole (μm) h | Diameter of hole (μm) d | t/h | h/d | Area rate (%) S | Lubricant | Back surface temperature (° C.) | Friction coefficient (−) | |
| Invention product 1 | 0.5 | 3.0 | 10 | 0.17 | 0.30 | 3.14 | Without | 85 | 0.010 | |
| Invention product 2 | 0.5 | 1.5 | 3 | 0.33 | 0.50 | 0.28 | Without | 95 | 0.015 | |
| Invention product 3 | 1.0 | 5.0 | 15 | 0.20 | 0.33 | 7.07 | Without | 80 | 0.010 | |
| Invention product 4 | 1.2 | 3.0 | 8 | 0.40 | 0.38 | 2.01 | Without | 85 | 0.010 | |
| Invention product 5 | 1.5 | 10.0 | 30 | 0.15 | 0.33 | 3.14 | Without | 85 | 0.015 | |
| Invention product 6 | 1.5 | 10.0 | 30 | 0.15 | 0.33 | 0.35 | Without | 95 | 0.015 | |
| Invention product 7 | 2.0 | 7.0 | 8 | 0.29 | 0.88 | 2.01 | Without | 90 | 0.015 | |
| Invention product 8 | 2.5 | 13.0 | 8 | 0.19 | 1.63 | 0.50 | Without | 100 | 0.015 | |
| Invention product 9 | 3.0 | 10.0 | 30 | 0.30 | 0.33 | 14.42 | Without | 105 | 0.020 | |
| Invention product 10 | 3.0 | 29.0 | 90 | 0.10 | 0.32 | 9.41 | Without | 105 | 0.020 | |
| Invention product 11 | 0.5 | 3.0 | 10 | 0.17 | 0.30 | 3.14 | With | 80 | 0.010 | |
| Invention product 12 | 2.0 | 8.0 | 20 | 0.25 | 0.40 | 3.14 | With | 85 | 0.010 | |
| Comparative product 1 | — | — | — | — | — | — | Without | 120 | 0.020 | No hole |
| Comparative product 2 | 2.5 | 4.0 | 10 | 0.63 | 0.40 | 3.14 | Without | 115 | 0.020 | |
| Comparative product 3 | 4.0 | 15.0 | 40 | 0.27 | 0.38 | 5.58 | Without | 120 | 0.030 | |

TABLE 2

| Item | Test condition Condition | Unit |
| --- | --- | --- |
| Tester | Thrust type friction tester | |
| Bearing Size | OD φ27.2 × ID φ22 | mm |
| Speed | 3 | m/s |
| Load pattern | Apply cumulative load per 1 MPa at every 10 min (execute test until Max 7 MPa) | |
| Lubricating oil temperature | 50 | ° C. |
| Oil supplying amount | 20 | ml/min |
| Shaft material | S55C | |
| Shaft roughness | 1 | Rmax μm |

A consideration will be given of the results of the seizure test and the measured results of the friction coefficient shown in Table 1. First, in the comparative product sample 1 in which no hole 7 is formed, the back surface temperature in the seizure test is 120° C. On the other hand, in the invention product samples 1 to 12, the highest back surface temperature is 105° C. In other words, it is known that the present invention product samples 1 to 12 in which the hole 7 is formed, is excellent in the anti-seizure performance.

However, even in the case that the hole 7 is formed, the height of the bank portion 8 is high such as 4 μm in the comparative product sample 3. Accordingly, the back surface temperature in the seize test is 120° C., and is higher than the present invention product samples 1 to 12 in which the height of the bank portion 8 is set to be equal to or less than 3 μm. Accordingly, even if the hole 7 is formed, when the height of the bank portion 8 is too high, it can be understood that an improvement of the anti-seizure performance can not be desired.

Further, the friction coefficient in the comparative product sample 1 in which no hole 7 is formed is 0.020. On the contrary, in the invention product samples 1 to 12, the invention product samples 9 and 10 in which the height of the bank portion 8 is 3 μm, the friction coefficient is 0.020, however, in the invention product samples 1 to 8, 11 and 12 in which the height of the bank portion 8 is low, the friction coefficient is equal to or less than 0.015, and a reduction in the friction coefficient is seen. Accordingly, it can be considered that the lower the height of the bank portion 8 is, the lower the friction coefficient becomes, whereby the anti-seizure performance is improved.

Figure 7A:
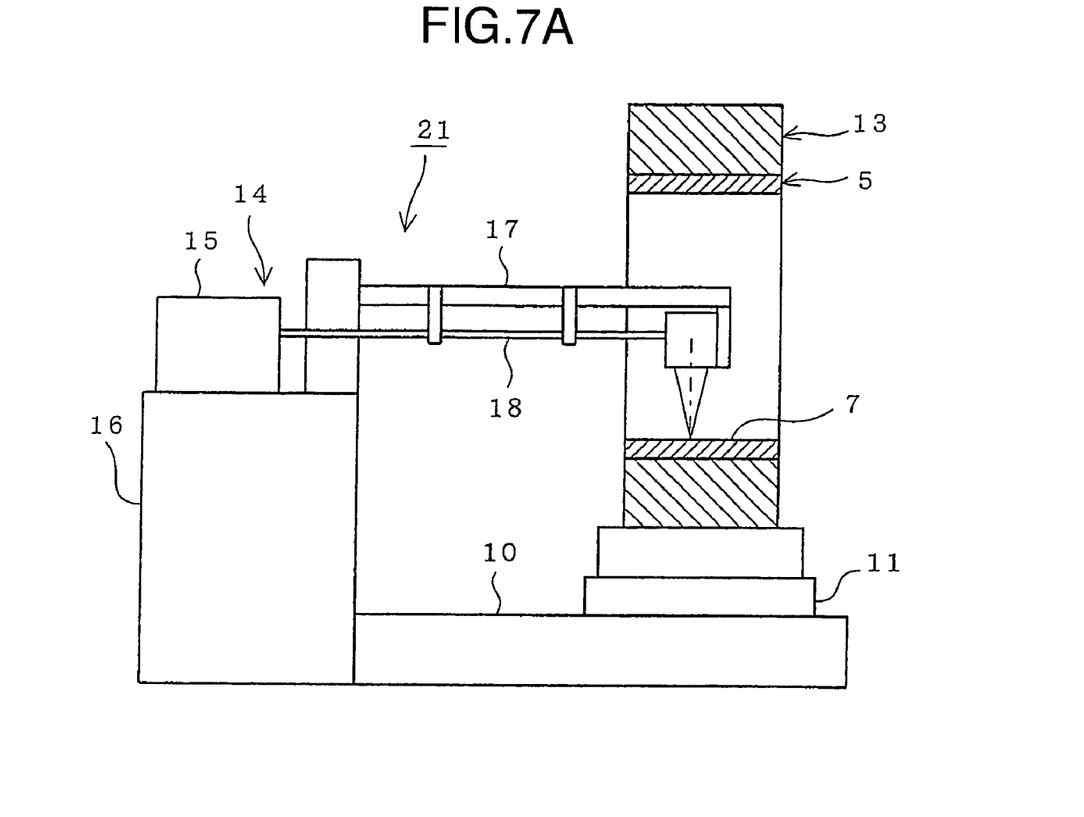
FIG. 7 is a view corresponding to FIG. 5, and shows a hole processing apparatus in accordance with the other embodiment of the present invention.
Figure 7B:
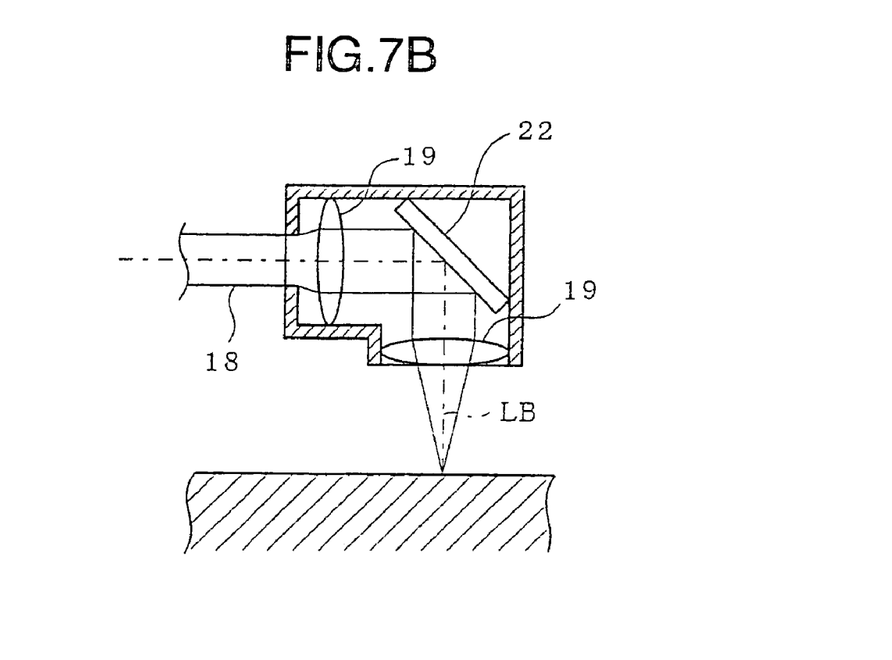

FIG. 7 shows a hole processing apparatus 21 in accordance with the other embodiment of the present invention. This apparatus is different from the hole processing apparatus 9 in the embodiment mentioned above in a point that the radial direction from the fiber 18 is set to a horizontally lateral direction, a pair of focusing lenses 19 are arranged in the leading end portion of the fiber 18 so as to differentiate an optical axis at 90 degree each other, a mirror 22 is arranged so as to be positioned between a pair of focusing lenses 19, and the laser beam LB irradiated from the end of the fiber 18 is bent by the mirror 22 so as to be irradiated onto the slide surface 6 of the crank pin bearing 5.

In this case, the present invention is not limited to the embodiments described above and shown in the drawings, and can be expanded and modified in the following manner.

A plurality of holes 7 are formed on the slide surface in a vertically and horizontally aligned state, however, the structure is not limited to this, but for example, a plurality of holes may be formed irregularly so as not to be aligned.

The holes 7 are not necessarily formed in an entire of the slide surface 6, but may be formed in any portion as far as the holes are formed in a portion to which the high pressure is applied. For example, in the case of the main bearing of the engine, since the portion to which the high pressure is applied on the slide surface is an approximately center portion in the peripheral direction of the lower half bearing, the region in which the holes are formed may be set to an approximately center portion in the peripheral direction in the slide surface of the half bearing. In the slide surface, in the case that both end portions in the axial direction correspond to the portion to which the high pressure is applied, because the opposing member is brought into offset contact with both end portions in the axial direction at a time of sliding, the holes 7 are formed in both sides in the axial direction of the half bearing 5a. Further, in the case in which the great load is applied to a part of both sides in the axial direction of the half bearing, the holes 7 may be formed in the portion to which the great load is applied.

The present invention is not limited to the crank pin bearing 5 and the main bearing, but may be applied to a piston pin bearing 4 or a thrust washer, or may be applied, for example, to a slide member which is expected to slide in a state in which the high pressure is applied to the slide surface, such as an industrial machinery or the like.

An overlay may be provided on the bearing alloy layer, and the holes 7 may be formed on a surface (a slide surface) of the overlay.

It should be further understood by those skilled in the art that the above description has been made in connection with the embodiments of the present invention and that various changes and modifications may be made in the present invention within the scope of the present invention.

The invention claimed is:

1. A slide member having a plurality of concave portions formed on a slide surface with respect to an opposing member, wherein said concave portions are formed in accordance with a laser processing, and in the case that a height of a bank portion generated in the periphery of said concave portions in accordance with the laser processing so as to bulge from said slide surface is set to t, and a depth of said concave portions from said slide surface is set to h, a value t is equal to or less than 3 μm, and a rate t/h is between 0.1 and 0.5.

2. A slide member as claimed in claim 1, wherein in the case that a diameter of said concave portion in said slide surface is set to d, a rate h/d is between 0.3 and 1.0.

3. A slide member as claimed in claim 2, wherein a rate of said concave portions in a region in which the concave portions are formed is set to an area rate between 0.5 and 10%.

4. A slide member as claimed in claim 2, wherein said slide surface is formed in a semi-cylindrical shape or a cylindrical shape, and said concave portions are arranged along a line which is inclined with respect to a circumferential direction of said slide surface.

5. A slide member as claimed in claim 1, wherein a rate of said concave portions in a region in which the concave portions are formed is set to an area rate between 0.5 and 10%.

6. A slide member as claimed in claim 5, wherein said slide surface is formed in a semi-cylindrical shape or a cylindrical shape, and said concave portions are arranged along a line which is inclined with respect to a circumferential directionof said slide surface.

7. A slide member as claimed in claim 1, wherein said slide surface is formed in a semicylindrical shape or a cylindrical shape, and said concave portions are arranged along a line which is inclined with respect to a circumferential direction of said slide surface.

8. A slide member manufacturing method for manufacturing the slide member as claimed in claim 1, wherein said concave portions is formed by irradiating a laser beam having a power density between 1 MW/cm$^2$ to 15 GW/cm$^2$ to said slide surface.

9. A slide member manufacturing method as claimed in claim 8, wherein said laser beam is constituted by a pulselike laser beam having a frequency equal to or more than 1 kHz.

* * * * *